US009935454B2

United States Patent
Tepper et al.

(10) Patent No.: US 9,935,454 B2
(45) Date of Patent: Apr. 3, 2018

(54) TRANSFORMER PROTECTION SYSTEM

(71) Applicant: ABB Technology AG, Zurich (CH)

(72) Inventors: Jens Tepper, Brilon (DE); Abdelbahi Tamzarti, Kassel (DE); Nils Leenen, Lorsch (DE); Stefan Staudinger, Bestwig (DE)

(73) Assignee: ABB Schweiz AG, Baden (CH)

( * ) Notice: Subject to any disclaimer, the term of this patent is extended or adjusted under 35 U.S.C. 154(b) by 273 days.

(21) Appl. No.: 14/733,568

(22) Filed: Jun. 8, 2015

(65) Prior Publication Data

US 2015/0270699 A1    Sep. 24, 2015

Related U.S. Application Data

(63) Continuation of application No. PCT/EP2013/003610, filed on Nov. 29, 2013.

(30) Foreign Application Priority Data

Dec. 12, 2012    (EP) .................................... 12008304

(51) Int. Cl.
*H02H 7/04*    (2006.01)
*H01F 27/40*    (2006.01)
(Continued)

(52) U.S. Cl.
CPC ............. *H02H 7/04* (2013.01); *H01F 27/402* (2013.01); *H02H 1/0023* (2013.01);
(Continued)

(58) Field of Classification Search
CPC ........ H02H 7/04; H02H 3/083; H02H 3/0935; H02H 1/0023; H02H 7/042; H01F 27/402
See application file for complete search history.

(56) References Cited

U.S. PATENT DOCUMENTS 4,940,933 A    7/1990 Jenkins
5,650,902 A    7/1997 Herkenrath et al.
(Continued)

FOREIGN PATENT DOCUMENTS

DE        43 45 170 A1     3/1995
WO    WO 2007/136836 A2   11/2007
WO    WO 2012/118645 A1    9/2012

OTHER PUBLICATIONS

International Search Report (PCT/ISA/210) dated Jan. 17, 2014, by the European Patent Office as the International Searching Authority for International Application No. PCT/EP2013/003610.

*Primary Examiner* — Zeev V Kitov
(74) *Attorney, Agent, or Firm* — Barnes & Thornburg LLP

(57) ABSTRACT

An exemplary transformer protection system including a protective housing having a transformer which is arranged in the protective housing, a transformer core, and at least one primary-side electrical winding and a secondary-side electrical winding which is magnetically coupled to the primary-side electrical winding. The protection system also includes at least one detection apparatus for a measurement variable from which the occurrence of an interference arc within the protective housing can be derived, and an evaluation unit for generating a fault signal from the measurement variable of the at least one detection apparatus in the case of an interference arc. Further, the protection system includes at least one rapid-earthing apparatus for at least one of the electrical windings which is intended to be activated by the fault signal, wherein the rapid-earthing apparatus is designed in such a way that effective electrical earthing immediately after activation of the fault signal is ensured.

15 Claims, 1 Drawing Sheet

(51) Int. Cl.
 *H02H 1/00* (2006.01)
 *H02H 3/08* (2006.01)
 *H02H 3/093* (2006.01)

(52) U.S. Cl.
 CPC .......... *H02H 3/083* (2013.01); *H02H 3/0935* (2013.01); *H02H 7/042* (2013.01)

(56) References Cited

U.S. PATENT DOCUMENTS

| | | |
|---|---|---|
| 2008/0055800 A1 | 3/2008 | Aiello et al. |
| 2008/0192389 A1 | 8/2008 | Muench et al. |
| 2012/0217053 A1 | 8/2012 | Ballard et al. |

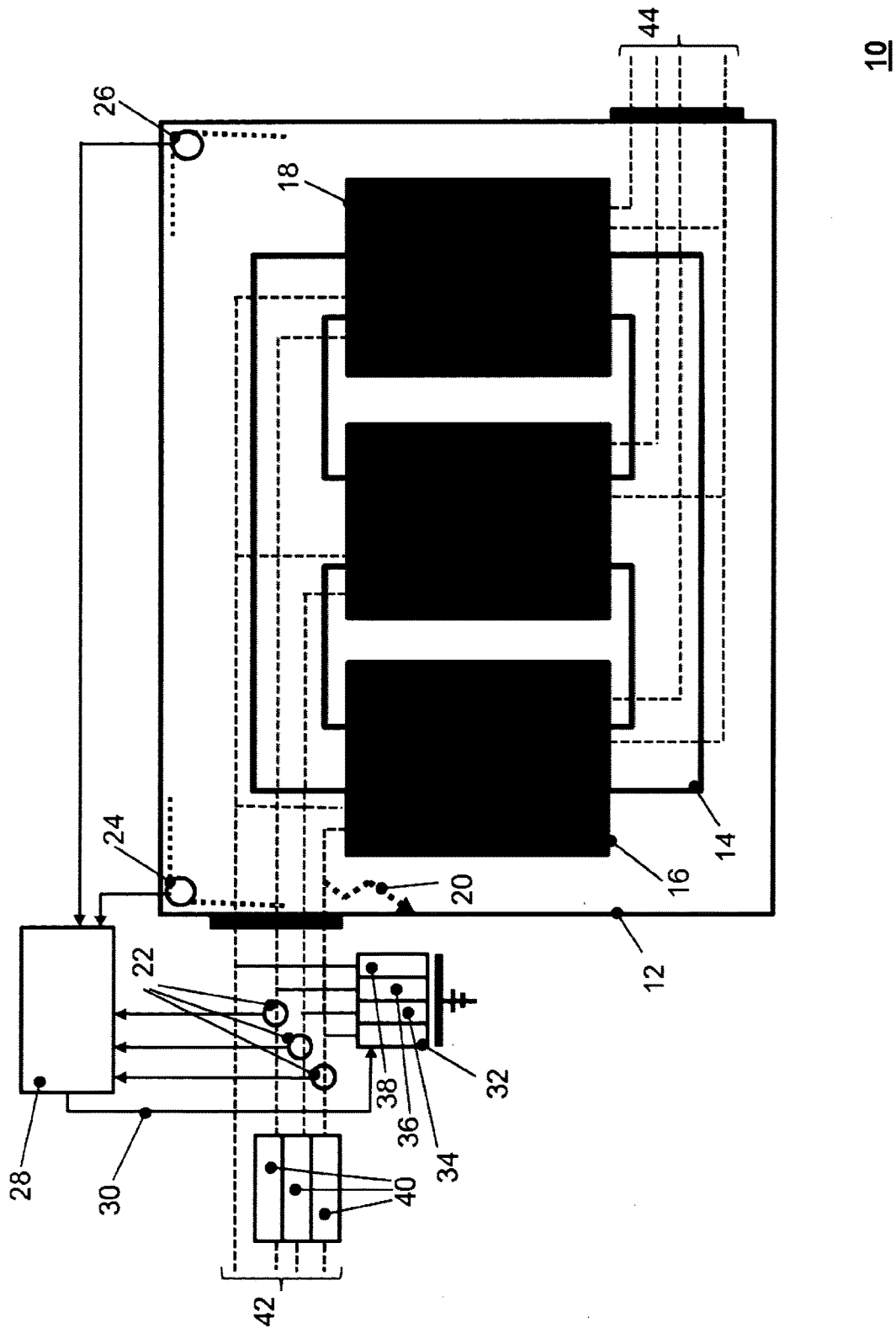

TRANSFORMER PROTECTION SYSTEM

RELATED APPLICATION(S)

This application claims priority as a continuation application under 35 U.S.C. § 120 to PCT/EP2013/003610, which was filed as an International Application on Nov. 29, 2013 designating the U.S., and claims priority to European Application 12008304.3 filed in Europe on Dec. 12, 2012. The entire content of each prior application is hereby incorporated by reference.

FIELD

The disclosure relates to a transformer protection system including a protective housing, a transformer arranged in the protective housing and including a transformer core and at least one primary-side electrical winding and a secondary-side electrical winding that is magnetically coupled to the primary-side winding.

BACKGROUND INFORMATION

Known high voltage transformers, for example, in the voltage range from 1 kV to 72.5 kV or higher can be embodied as dry transformers that include an output capacity in the range of 0.5 MVA to 63 MVA, for example. However, for some applications, transformers of this type should be arranged in a protective housing. This can be for various reasons, by way of example that the transformer is to be protected from harsh environmental conditions such as saline sea air. In such a case, the protective housing can be a hermetically encapsulated housing, wherein the thermal energy that arises in the housing during normal operation is dissipated to the outside by a heat exchanger. However, transformers are also accommodated in a protective housing as specified in order to protect personnel and to prevent any human contact with any parts that are carrying voltage. Transformers that have a higher output capacity by way of example 200 MVA and higher are embodied as oil transformers. In this case, the transformer is arranged in an oil-filled vessel that ultimately also represents a protective housing in terms of the disclosure.

It is however disadvantageous that arc faults can occur in the event of a fault between voltage-carrying parts of the transformer or its supply lines through the protective housing and the housing that is grounded for safety reasons. An arc fault of this type includes a high energy density and can in the event of a short circuit completely destroy a normal protective housing depending upon the respective feed-in of power from the supply network. For this reason, protective housings are available for transformers that are designed in such a manner that an arc can burn in the internal compartment of the transformer for a specific period of time without posing any risk to personnel or damaging the protective housing. A representative example is disclosed in WO 2012118645 A1. Protective housings of this type are however extremely costly to produce. The term 'protective housing' is understood in each case also to mean an encapsulation.

SUMMARY

An exemplary dry transformer protection system is disclosed, comprising: a protective housing; a dry transformer arranged in said protective housing, said dry transformer having a transformer core and having at least one primary-side winding and a secondary-side electrical winding that is magnetically coupled to said primary-side winding; at least one detection device for a measuring variable to determine whether an arc fault has occurred within the protective housing; an evaluation unit for generating a fault signal from the measuring variable of the at least one detection device in the event of an arc fault; and at least one high speed grounding device for at least the primary-side winding, the at least one high speed grounding device is configured to be activated by the fault signal, wherein the high speed grounding device is configured such that an effective electrical grounding is ensured immediately after the fault signal is activated.

BRIEF DESCRIPTION OF THE DRAWINGS

The disclosure, further embodiments and further advantages are to be described in detail with reference to the exemplary embodiments illustrated in the drawings, in which:

FIG. 1 illustrates a transformer protection system according to an exemplary embodiment of the disclosure.

DETAILED DESCRIPTION

Exemplary embodiments of the present disclosure provide an improved arcing protection for transformers that are arranged in protective housings.

According to an exemplary embodiment, transformer protection includes at least one detection device for a measuring variable from which it is possible to conclude that an arc fault can have occurred within the protective housing, an evaluation unit for generating a fault signal from the measuring variable of the at least one detection device in the event of an arc fault, and at least one high speed grounding device for at least the primary-side electrical windings that is provided for the purpose of being activated by the fault signal, wherein the high speed grounding device is embodied in such a manner that an effective electrical grounding is ensured immediately but at the latest 5 ms after the fault signal is activated.

The period of time during which an arc fault burns is a considerable influencing factor on the destructive force of an arc fault. The fundamental idea of the disclosure resides in the fact that the burning period of an arc is shortened by virtue of a high speed grounding of the electrical connections of the transformer in such a manner that damage to the protective housing or rather to the transformer by the arc fault is eliminated or rather at least considerably reduced. Without additional measures, the duration period of a short circuit in the network operation or rather of an arc that is associated therewith depends upon the protective system of the network in which the transformer is integrated. A protective system of this type recognizes a short circuit with the aid of an increased short circuit current and disconnects the affected network parts in a most selective manner as possible by power switches that are located in the network.

In order to detect a short circuit, a relevant network protection device specifies by way of example 50 ms from the point in time the short circuit occurs until a disconnect signal is transmitted to the relevant power switch. The power switch itself likewise calls for a time period that lies within this range from the point in time at which the disconnect signal is received until the short circuit is finally disconnected. Consequently, a short circuit prevails for at least 100 ms, in other words 5 network periods in the case of a frequency of 50 Hz prior to the short circuit being disconnected.

An arc fault that occurs during this period of time causes considerable damage or rather even destroys a protective housing that is not designed to withstand arc faults. By virtue of a high speed grounding in accordance with the disclosure of the at least one primary-side winding, at least the malfunctioning conductors of the winding are grounded immediately after the short circuit occurs, so that the short circuit current no longer flows through the high speed grounding device after the high speed grounding and the arc is extinguished. The short circuit current that continues to flow is recognized by the network protection system and subsequently disconnected. An arc fault is detected and the high speed grounding performed in accordance with the disclosure as quickly as possible, namely within a few milliseconds. It is thus ensured that the short circuit current has not achieved its maximum value if the arc has already been extinguished and this advantageously considerably reduces the risk of damage to the protective housing or rather reduces the amount of damage caused by the arc fault. The time specification of 5 ms represents an approximate maximum value that corresponds to a quarter period at 50 Hz. This is a value at which a short circuit current can have achieved approx. 50% of its peak value whilst taking into consideration of a maximum direct current portion. Ideally, shorter time periods such as 2-3 ms and less are of course to be aimed for.

It is initially ideally assumed that the energy flow direction within the transformer constantly flows from the primary-side winding to the secondary-side winding, in other words the associated primary-side network part can have active feed-ins whereas the secondary-side network part can have only passive consumers. It is ensured in this manner that in the event of a primary-side arc fault a short circuit current through the transformer is avoided and in the event of a secondary-side arc fault the associated short circuit current loads the transformer for only the shortest possible time period.

In accordance with an exemplary embodiment of the transformer protection system in accordance with the disclosure, a respective high speed grounding device is also provided for the secondary-side winding. The high speed grounding device can be connected synchronously with the high speed grounding device for the primary-side winding. It is thus ensured that after a successful high speed grounding a short circuit current does not flow through the transformer even in the case of an active secondary-side network part. Because the high speed grounding in accordance with the disclosure is already performed prior to the maximum flow of the short circuit current being achieved, the associated mechanical loading on the windings is also eliminated in an advantageous manner. Likewise, it is not possible in the case of an actual passive secondary-side network part for an arc fault to occur on the secondary-side as a result of a return feed to consumers that are possibly rotating.

According to an exemplary embodiment of the transformer protection system of the present disclosure, at least one detection device includes a light sensor for detecting flashes of light that occur within the protective housing. An arc is automatically associated with an emission of light. Therefore, if it is ensured that no scattered light can have penetrated the protective housing from the outside onto the detection region of the light sensor, then a light sensor for detecting an arc can be used within a protective housing. An arc fault can be reliably detected by virtue of the fact that an arc is recognized optically within the shortest period of time, for example, less than one millisecond. Such a short reaction time period of this type can be specified in order to disconnect an arc fault considerably in advance of achieving the maximum flow of the associated short circuit current.

According to an exemplary embodiment of the present disclosure, the protective housing of the transformer protection system includes multiple sub-divided inner regions, wherein one light sensor is allocated to each of these regions. A sub-division of this type can be provided by way of example by an air deflection plate of a cooling system within the protective housing. The regions that are formed in this manner are not completely separated, this arrangement does however provide optical shielding of the detection region of a respective light sensor so that accordingly a light sensor is provided that is allocated to the respective region. It is consequently ensured that the entire inner space of the protective housing in which flashes of light can occur is also monitored by corresponding light sensors. It is thus not possible for arc fault to remain undetected.

In accordance with an exemplary embodiment, a common light sensor is provided for at least two regions, the light sensor having a light waveguide that protrudes into the regions and is guided through the regions. As a consequence, it is possible in an advantageous manner that one and the same light sensor can detect flashes of light in multiple regions that are optically shielded from one another. For example, a light waveguide of this type can also be guided directly to the spots within the protective housing that are at particular risk with respect to an arc fault.

A light waveguide includes an inner material core made from a material with a first optical refractive index and a peripheral coating made from a material with a second refractive index. By selecting the material accordingly, it can be advantageous to minimize light that is guided in the light waveguide from exiting at its outer surfaces. The light in a light waveguide therefore often exits the light waveguide at one of its two ends. Nonetheless, it is however also possible in accordance with exemplary embodiments of the present disclosure for light to enter, at least to a limited extent, a light waveguide through the radial outer surface of the light waveguide. Where appropriate, it is also possible to provide an optical window to detect the incoming light. This can be achieved for example by selecting the material with a suitable refractive index or also by locally removing the peripheral coating. This is optionally provided in accordance with the disclosure so that a light waveguide can be guided in a simple manner by way of example in a meandering manner to the relevant sites within the protective housing. Consequently, it is advantageous that providing junctions in the light waveguide is not necessary and it can consequently be routed in a simple manner.

In accordance with another exemplary embodiment of the present disclosure, at least one detection device of the transformer protection system includes a current sensor for determining an electric current that is flowing through at least one of the windings. An excessively high electric current is also a suitable indication that an arc can have occurred within the transformer.

However, in order to avoid false activations, an exemplary embodiment of the present disclosure includes an evaluation unit in such a manner that a fault signal is only provided in the case of a respective arc fault being simultaneously detected with the aid of multiple physically independent measuring variables. The detection devices can include, for example, the use at least of one light sensor and a current sensor or also a combination of a light sensor and a pressure sensor. A light sensor is suitable as mentioned for detecting arc faults extremely rapidly. An excessively high current by way of example can however have multiple causes that are possibly also not caused by an arc fault. A logic AND coupling of two conditions consequently reduces in an advantageous manner the risk of a possible false activation. Because an arc is mainly associated with the development of gas, an increase in pressure in the closed protective housing is likewise a suitable criterion for the detection of an arc fault.

According to an exemplary embodiment of the present disclosure, the high speed grounding device includes a drive that is based on a gas expansion that can be initiated in an explosive manner. An excess pressure is generated in a hollow cylinder of the high speed grounding device for example by igniting a propellant and as a result a switching contact is moved in the direction of a grounding rail. A procedure of this type specifies a time period for example of 1.5 ms from the point of receiving the fault signal up to the effective grounding being performed so that whilst taking into consideration a time period of approx. 1 ms for detecting an arc a reactive time of approx. 2.5 ms occurs. Stored-energy spring operated mechanisms by way of example are however also feasible.

In accordance with an exemplary embodiment of the present disclosure, the protective housing of the transformer protection system is encapsulated in a hermetically sealed manner and includes a heat exchanger for dissipating the waste heat that arises in the protective housing during normal operation. A transformer is to be protected from saline sea air, for example, in the case of applications in the nautical field. The protective housing is used to encapsulate the transformer in a hermetically sealed manner, wherein the waste heat that arises during normal operation is then dissipated to the environment by a heat exchanger. In this manner, a normal cooling housing can be protected against arc faults without additional outlay.

According to an exemplary embodiment of the disclosure, the protective housing is already an arc fault housing which can have a higher safety classification as a result of the protection in accordance with the disclosure. In an exemplary embodiment described herein, the high speed grounding device is arranged outside the protective housing. As a consequence, a simple retrofit installation or rather also a simple maintenance procedure is possible. It is not necessary to attach the high speed grounding device directly on the protective housing; on the contrary, an arrangement on a likewise available busbar is also sufficient insofar as no network protection device or rather a power switch is provided between the busbar and the transformer, by which the transformer is separated from the busbar.

In accordance with an exemplary embodiment of the present disclosure, multiple transformers are provided with a respective protection housing, which are mutually connected in an electrical manner by a common connecting means (e.g., switches) and which include a high speed grounding device that influences the common connecting means. It is possible in this manner by a common high speed grounding device to protect multiple transformers that are connected in parallel to one and the same busbar, wherein each individual transformer should be allocated at last one dedicated detection device. When specified, a common evaluation unit that evaluates jointly the detected measuring signals of the detection devices is also provided. An exemplary embodiment of this type is suitable for example in the case of a secondary-side passive distribution network, for example also on a ship or the like.

In accordance with an exemplary embodiment, the electrical windings are embodied in a three-phase manner, for example, three winding bodies each having a primary-side winding and a secondary-side winding. Three-phase embodiments of transformers are, for example, known in stationary energy distribution networks. The option is provided in accordance with the disclosure fundamentally that even in the case of a single phase arc fault a three-phase grounding arrangement is provided and as a consequence a maximum degree of safety is achieved.

In a few cases, it can also prove to be expedient that in the case of a single phase short circuit selectively only the malfunctioning phase is grounded. The repercussions on the supply network are then reduced. For this purpose, the malfunctioning phase is to be recognized selectively, e.g., a respective excess current is used as an additional criterion in addition to a light sensor. In this case, the high speed grounding device is also to be provided for a single phase activation.

In accordance with an exemplary embodiment of the transformer protection system, the high speed grounding device is provided for a three-phase activation between the respective phases. This can be achieved both with and also without contact to ground.

FIG. 1 illustrates a transformer protection system according to an exemplary embodiment of the disclosure. As shown in FIG. 1, a transformer having a transformer core 14 and multiple windings 16, 18 is arranged in a protective housing 12. The protective housing is closed so that it is not possible for any scattered light to penetrate from the outside into the protective housing. The primary property of the protective housing resides in protecting the transformer from harsh operating conditions such as saline sea air, the transformer being arranged in the protective housing. For this reason, a heat exchanger, not illustrated, is also provided and the heat exchanger dissipates the heat that arises in the protective housing 12 during normal operation of the transformer.

The windings 16, 18 of the transformer include in each case three primary-side and three secondary-side windings whose housing-side connections are identified by the reference numeral 42 and 44. In each case, a primary-side winding and a secondary side winding are arranged on a common hollow cylindrical winding body that for its part is penetrated by a respective limb of the transformer core 14. An exemplary arc fault 20 is illustrated within the housing 12 and the arc fault is burning between one of the primary-side supply lines and the housing 12. A four-pole high speed grounding device having in each case a single-phase high speed grounding device 32, 34, 36, 38 for each phase conductor and the common return conductor is provided on the outer face of the housing. However, it is often provided that all four high speed grounding devices 32, 34, 36, 38 also switch synchronously in the case of a single-phase fault.

The arc fault 20 is detected by a light sensor 24 for example as a result of the associated flashes of light and the light sensor transmits a corresponding measuring signal to an evaluating device 28. In addition, this evaluation unit 28 also evaluates measuring signals of a further light sensor 26 and measuring signals from a current transformer 22. As a result of optically shielding the light sensor 26 from the arc 20, the measuring signal of the light sensor 26 alone will possibly not be sufficient to detect the arc fault 20. The current transformers 22 generate a measuring signal for each phase conductor of the primary-side supply lines. Because excess currents in a phase conductor alone, at least not within a desired period of time of approx. 1 ms, can be a precise criterion for the presence of an arc fault, the evaluation unit 28 forms a logic AND coupling between the optical detection of an arc fault by the light sensors 24 or 26 and the occurrence of an excess current in at least one of the three phase conductors. Estimation algorithms are feasible that do not use an excess current as a fault criterion but rather use by way of example a deviation from a predicted current value by a differential amount.

In the event that an arc 20 has been detected by the evaluation unit 28, a fault signal 30 is transmitted within the shortest period of time, e.g. 1 ms after the arc occurs, to the high speed grounding devices 32, 34, 36, 38 that likewise within the shortest period of time by way of example within two further milliseconds ground the primary-side supply lines. In this case, a short circuit is generated in all three phase conductors, wherein the short circuit current flows outside the transformer after an effective high speed grounding procedure. Consequently, the arc becomes extinct after approx. 3 ms and a further risk to the protective housing 12 is eliminated.

The present three-phase short circuit is connected to a correspondingly high three-phase short circuit current so that the network protection system that is already available in an energy supply network and is not illustrated in this FIGURE responds and initiates a selective disconnection of the malfunctioning network parts. This occurs in this example by opening the power switch 40 for all primary-side supply lines. Assuming a switching delay time of 150 ms, the short circuit therefore prevails for a total of 150 ms, prior to a final disconnection by the network protection system.

Once the short circuit has been disconnected by the power switch 40, after implementing all specified safety procedures, the protective housing is to be checked for any possible damage and the cause for the arc fault is to be established. After eliminating possible fault sources, the high speed grounding device 32, 34, 36, 38 is to be returned where appropriate to its operational state and the transformer can be connected back into the network operation.

In accordance with a further embodiment, not illustrated, secondary-side high speed grounding devices are likewise provided in order in the event of a fault to ground both sides of the transformer. Consequently, a maximum degree of safety is achieved in the event of a fault.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE NUMERALS

10 Exemplary transformer protection system
12 Protective housing
14 Transformer core
16 First electrical winding
18 Second electrical winding
20 Exemplary arc fault
22 First detection device (current transformer)
24 Second detection device (light sensor)
26 Third detection device (light sensor)
28 Evaluation unit
30 Fault signal
32 First high speed grounding device
34 Second high speed grounding device
36 Third high speed grounding device
38 Fourth high speed grounding device
40 Power switch
42 Primary-side connections
44 Secondary-side connections

What is claimed is:

1. A dry transformer protection system comprising:
a protective housing;
a dry transformer arranged in said protective housing, said dry transformer having a transformer core and having at least one primary-side winding and a secondary-side electrical winding that is magnetically coupled to said primary-side winding;
at least one detection device for a measuring variable to determine whether an arc fault has occurred within the protective housing;
an evaluation unit for generating a fault signal from the measuring variable of the at least one detection device in the event of an arc fault; and
at least one high speed grounding device for at least the primary-side winding, the at least one high speed grounding device is configured to be activated by the fault signal,
wherein the high speed grounding device is configured such that an effective electrical grounding is ensured immediately after the fault signal is activated.

2. The dry transformer protection system as claimed in claim 1, wherein the at least one detection device includes a light sensor for detecting flashes of light that occur within the protective housing.

3. The dry transformer protection system as claimed in claim 1, wherein the protective housing includes multiple sub-divided inner regions, wherein each of these regions is allocated at least one light sensor.

4. The dry transformer protection system as claimed in claim 3, wherein a common light sensor for at least two regions, said common light sensor having a light waveguide that protrudes into said regions or is guided through said regions.

5. The dry transformer protection system as claimed in claim 4, wherein the light waveguide is provided for receiving light at least on part of a radial outer surface of the light waveguide.

6. The dry transformer protection system as claimed in claim 1, wherein at least one detection device includes a current sensor for determining electric current that is flowing through at least one of the windings.

7. The dry transformer protection system as claimed in claim 1, wherein the evaluation unit is configured such that a fault signal is only output in the case of an arc fault being detected respectively with reference to multiple physically independent measuring variables.

8. The dry transformer protection system as claimed in claim 1, wherein the at least one high speed grounding device includes a drive that is based on a gas expansion that is initiated as an explosion.

9. The dry transformer protection system as claimed in claim 1, wherein the protective housing is an arc fault housing.

10. The dry transformer protection system as claimed in claim 1, wherein the at least one high speed grounding device is arranged outside the protective housing.

11. The dry transformer protection system as claimed in claim 1, wherein the electrical windings are embodied in a three-phase manner.

12. The dry transformer protection system as claimed in claim 11, wherein the high speed grounding device is provided for a single-phase activation.

13. The dry transformer protection system as claimed in claim 11, wherein the high speed grounding device is provided for a three-phase activation between the respective phases.

14. The dry transformer protection system as claimed in claim 1, wherein the at least one detection device includes a pressure sensor for detecting an increase in pressure within the protective housing.

15. The dry transformer protection system as claimed in claim 2, wherein the at least one detection device further includes a pressure sensor for detecting an increase in pressure within the protective housing.

* * * * *